July 29, 1941.  D. E. AUSTIN  2,250,618
AIR CONDITIONING SYSTEM
Filed Feb. 25, 1939  2 Sheets-Sheet 1
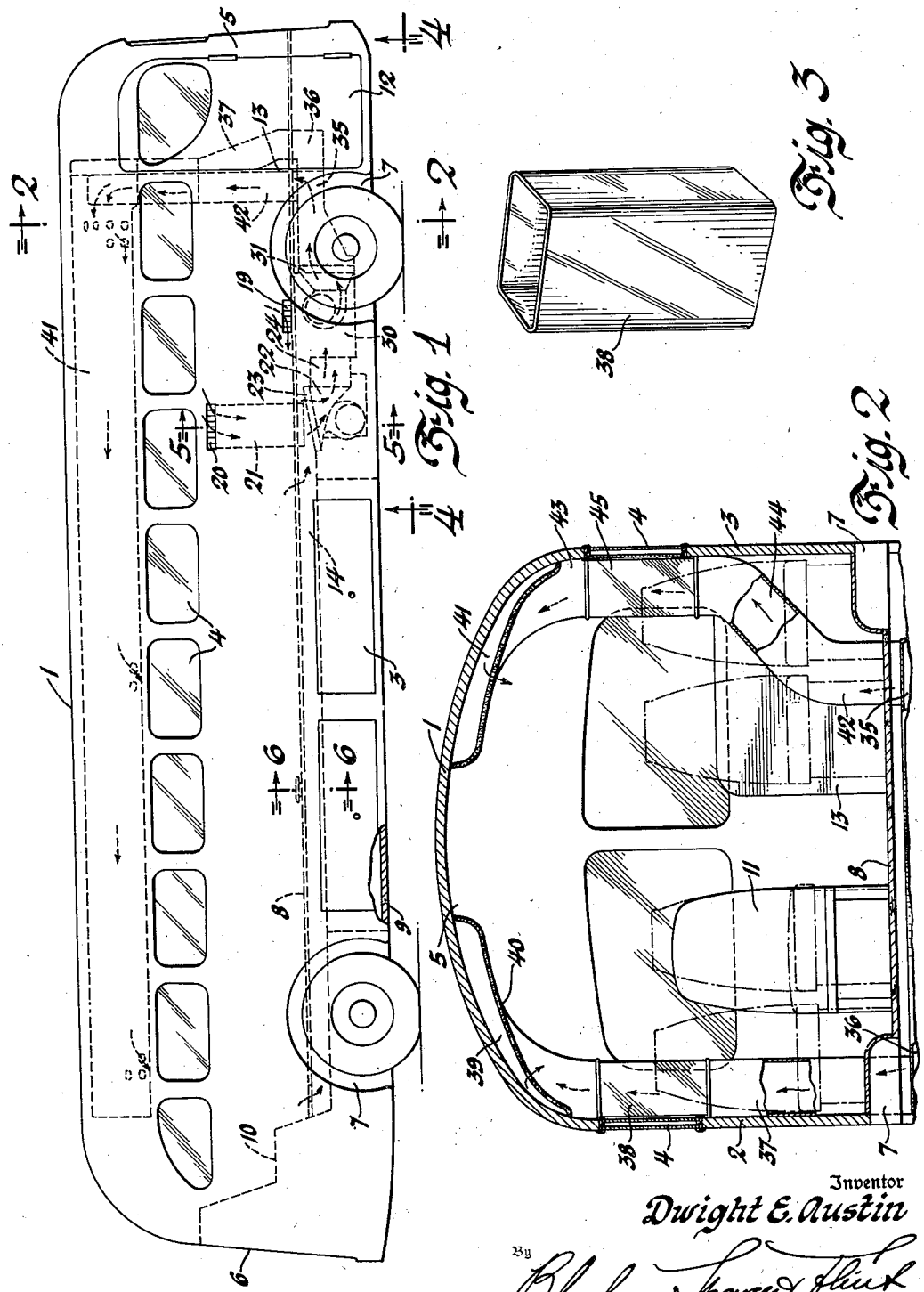
Inventor
Dwight E. Austin
By
Blackmore, Spaeer & Hink
Attorneys

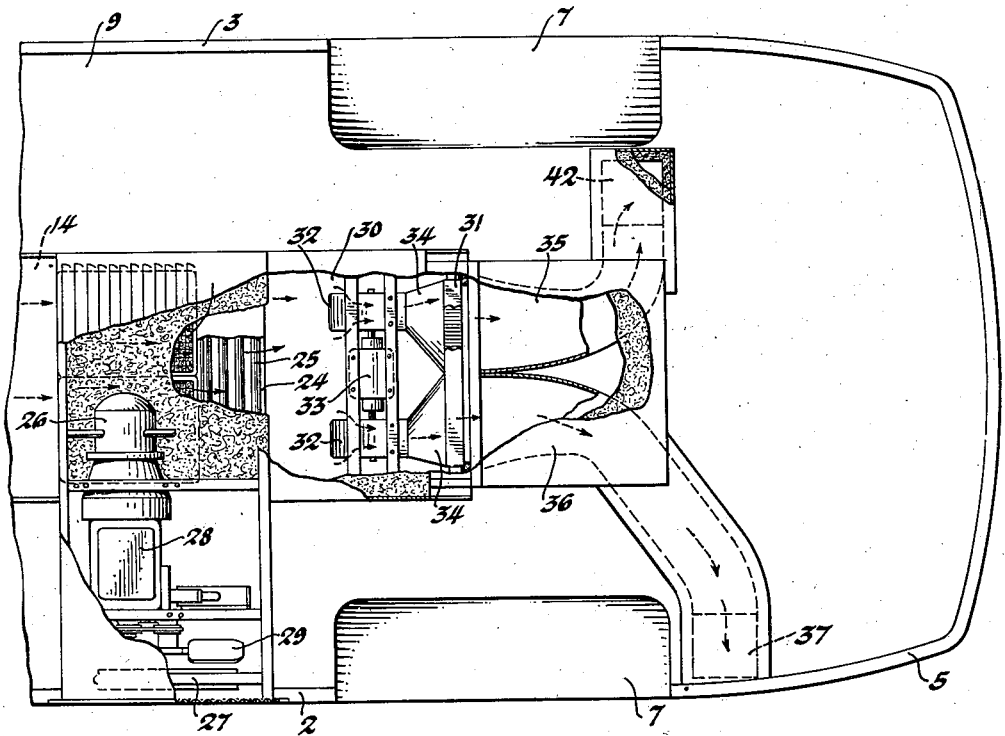
Fig. 4
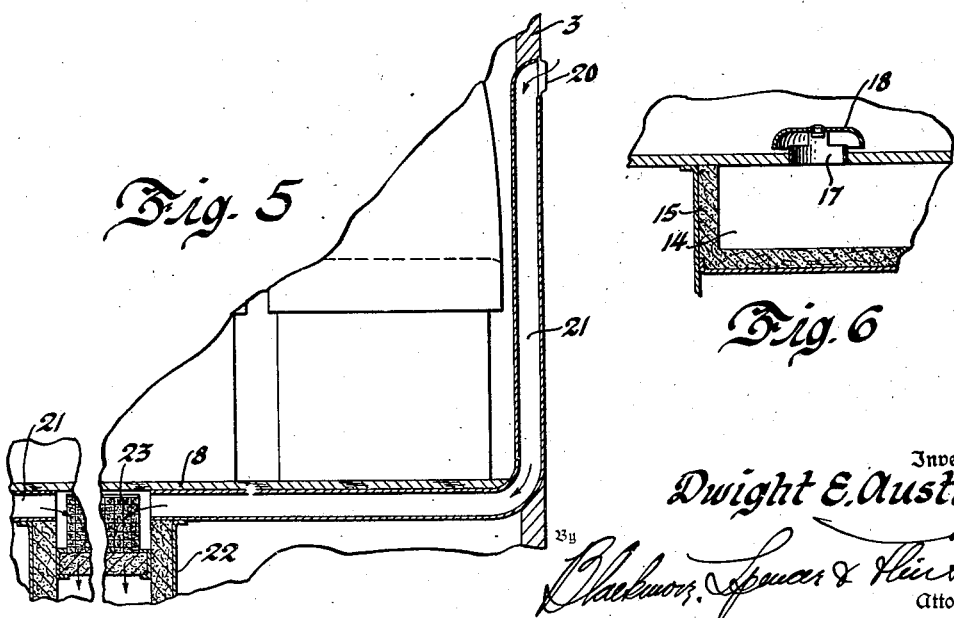
Fig. 5
Fig. 6
Inventor
Dwight E. Austin

Patented July 29, 1941

2,250,618

UNITED STATES PATENT OFFICE 2,250,618

AIR CONDITIONING SYSTEM

Dwight E. Austin, Pontiac, Mich., assignor to Yellow Truck & Coach Manufacturing Company, Pontiac, Mich., a corporation of Maine Application February 25, 1939, Serial No. 258,414

6 Claims. (Cl. 98—10)

This invention relates to the construction of a motor coach incorporating an air conditioning system.

As distinguished from customary makeshift installations of separately designed heating and cooling systems in existing vehicles for passenger comfort, the present invention is concerned with an air conditioned coach especially designed for the purpose and having built-in as an integral part thereof an air conditioning system. Among other things the body walls are insulated against heat loss and the air conditioning system including its air passages and conduits is arranged out of sight and in a manner to offer least interference to pay load. Accordingly a substantially flat floor is used for the passenger deck at a level near the upper limits of the wheel wells in the body side walls and the space below the passenger deck is utilized conveniently for the location of the power plant and luggage lockers as well as the air conditioning mechanism together with an exhaust duct extending longitudinally along the vehicle center line between the transversely spaced wheel wells. The air conditioning mechanism is located at the front end of the exhaust duct and from it a pair of branch conduits extend outwardly and then upwardly along the body side walls to a pair of wide and shallow distributing ducts in the roof of the coach having metered openings for spreading the conditioned air evenly throughout the interior of the passenger compartment.

The arrangement and relation of parts may be better understood upon reference to the accompanying drawings wherein Figure 1 is a side elevation showing the improved coach construction; Figure 2 is a transverse section taken on line 2—2 of Figure 1; Figure 3 is a detail perspective view of a transparent section of the air delivery conduit to be located in the region of the observation windows of the coach; Figure 4 is a bottom plan figure looking in the direction of the arrows on line 4—4 of Figure 1 with the wheels removed and parts broken away; Figure 5 shows a fragment of the coach in transverse section on line 5—5 of Figure 1 and Figure 6 is a detail section on line 6—6 of Figure 1.

The vehicle illustrated includes a roof 1 and a pair of side walls 2 and 3 having a longitudinal succession of observation windows 4. To reduce heat loss the windows 4 consist of two spaced apart panes of glass providing a dead air space therebetween and additionally the interior surface of the body walls may be covered with suitable heat insulating material such as thin metallic foil. The foil is a well known product and is selected primarily because of its light weight and lack of bulkiness. Indented in each side wall 2 and 3 in spaced relation to the front wall 5 and rear wall 6 are wheel enclosing pockets or wells 7 arranged so that the wheels will not extend substantially outside the side wall limits. In order that these wells will not project into the passenger compartment so as seriously to interfere with seating arrangements, the floor or passenger deck 8 is located on a level near the tops of the wheel wells and below the deck 8 is a luggage carrying platform 9 extending between the lower edges of the side walls and closing the underside of the body. The luggage carrying space may be accessible through doors associated with each side wall and preferably is located wholly between the front and rear wheel wells.

At its rear edge the passenger deck 8 terminates in spaced relation to the back wall 6 and is joined to the wall by a stepped partition 10 which provides a transverse seat extending across the vehicle just ahead of the rear wall and affords thereunder a compartment for the location of the engine or power plant operatively connected with the rear wheels for driving the vehicle. Ahead of the forward wheel wells and to one side of the vehicle center line is located the driver's seat 11, the back of which can be seen in Figure 2. The loading platform extends from the driver's seat to the entrance door 12 in the curb side of the vehicle and projecting upwardly from the floor to about the lower edge of the side wall window and in transverse alignment with the rear edge of the door opening is located the usual wall or decency panel 13 in protective relation to the foremost passenger seats.

Below the floor 8 and centrally between the wheel wells in the opposite side walls 2 and 3 is a longitudinally extending air exhaust duct 14 which may be lined with suitable insulation material 15 as best seen in Figure 6. Figure 6 also illustrates the air intake openings leading into the exhaust duct at suitable intervals throughout the length of the coach and preferably out of the way under the passenger seats. In order to avoid dirt and sweepings dropping into the duct the intake includes a short length of standpipe 17 rising above the surface of the floor and carrying a shield or domed cap 18. One or more similar domed tubes may be located in the floor beyond the exhaust duct as indicated generally at 19 in Figure 1 for exhausting air from the inside of the vehicle to the outside. To compensate for the ejected air a fresh air intake 20 is located in each side wall 2 and 3 just below the line of the windows from which leads downwardly and inwardly a wide shallow duct 21 opening into the under floor duct 14 preferably near the front end thereof.

The front end of the exhaust duct opens into an enlargement 22 in which may be positioned one or more replaceable package filters 23 for separating dust from the air moving through the tunnel 14. This enlargement 22 in turn opens into a chamber 24 adapted to contain a cooling coil 25 of a refrigerating unit. The refrigerating unit is illustrated as including a compressor 26, an air cooled condenser 27 and an air or water cooled internal combustion engine 28 which drives the compressor and also a fan 29 for passing air through the condenser 27 and over the engine cylinder block. The complete cooling unit including the coils 25 preferably forms an integral assembly which can be completely removed from the vehicle during the winter season in order to reduce dead load.

Forward of the chamber 24 is a compartment 30 to contain a radiator 31 arranged for connection by suitable valved conduits with the cooling system of the vehicle propelling engine. By proper adjustment of the valving the radiator 31 can be cut into or out of the engine cooling circuit and when it is used as a part of the cooling circuit the exchange of waste engine heat serves to warm the air circulated in the conditioning circuit. For inducing circulation of air a pair of blower or fan units 32—32, both driven by an electric motor 33, are contained within the chamber 30 to exhaust air from the body through the duct 14 and deliver it through shrouds 34—34 covering the rear face of the radiator 31 for discharge into a pair of branch conduits 35 and 36 which diverge outwardly toward the opposite side walls of the vehicle.

In the case of the branch duct 36 on the driver's side of the vehicle, this extends to the vehicle side wall just ahead of the adjacent front wheel well and joins with a vertical riser 37 leading upwardly beside the driver's seat 11 and containing a transparent section 38 in the region of the window opening giving an unobstructed line of vision through the windows. Incidentally, some light material such as ribbon streamers, may be located within the riser so as to be blown upwardly by the draft of air therein to give a visual indication within the transparent section 38 of the delivery of air. At its upper end the riser 37 empties into a longitudinally extending distributor duct 39 mounted in the roof over the row of passenger seats and to one side of the aisle so as not to interfere with headroom for passengers in the aisle. Ample headroom for seated passengers is insured by making the delivery duct flat and wide. Its underside may be provided with a suitable number of metered openings or perforations 40 spaced throughout its length in predetermined relation to insure an even distribution of conditioned air into the interior of the body.

A similar distributing duct 41 is located in the roof on the opposite side of the vehicle and its inlet end is connected by a vertically offset riser leading from the branch 35. In this case the lower portion 42 of the riser is located inwardly of the adjacent wheel well and extends upwardly from the floor to the rear of the loading platform and is fastened on the rear face of the decency panel 13 so as to be outside the limits of the loading platform. It is connected to the upper riser portion 43 positioned against the side wall 3, by an upwardly and outwardly extending diagonal portion 44 in spaced relation to the top of the adjacent wheel well so as to offer ample foot room for the passenger in the front seat adjacent the wall.

Here again the riser includes a transparent section 45 in the region of the windows for an unobstructed view.

The arrangement of the pair of risers in the front of the vehicle and closely adjacent the side walls with or without the inclusion therein of the transparent sections 38 and 45 avoids any semblance of bulky obstructions in the passenger compartment and in cooperation with the roof and floor ducts provides a clean installation for insuring an attractive interior appearance.

While the description has referred to the use of the cooling system for summer operation and the heating system for winter operation, it will be understood that the two systems may operate conjointly for certain weather conditions. For example, the cooling system may be utilized for the condensation and extraction of moisture from the air being circulated while the heating system warms the dehumidified air. The operation of both systems can be automatically controlled in accordance with temperature and/or humidity demands through the use of suitable thermostat and humidostat control devices.

I claim:

1. In a passenger coach having indented wheel wells in the side walls and a loading platform ahead of one of the wells, a decency panel extending upwardly between the loading platform and said wall, and a vertically offset conduit having its lower portion extending upwardly from the floor and inwardly of the well behind the panel and its upper portion extending beside the wall in vertically spaced relation to the well to afford foot room for a passenger seated immediately behind the panel.

2. In a vehicle having a window in the wall thereof, an air conditioning system for the interior of the vehicle including an air passage lying alongside said wall and having a transparent section in the region of said window.

3. In a passenger coach having windows in the walls thereof and an operator station at the forward end of the coach, an air duct extending vertically beside one of the walls at the operator station and a transparent section in said duct in the vertical zone of the windows.

4. In a passenger coach having a decency panel at the edge of the loading platform and door opening and immediately forward a pair of passenger seats, a wheel well indented in the coach side wall beside the door opening, and a riser duct having vertically offset portions, the upper of said portions extending beside the coach side wall and the lower portion extending inwardly of the wheel well and centrally of the pair of passenger seats on the face of the decency panel opposite the loading platform and affording foot room on both sides thereof ahead of both of said pair of passenger seats.

5. A passenger coach having a wheel well indented in the side wall immediately adjacent the loading platform with an upright decency panel ahead of a row of passenger seats and being characterized by a riser duct having a lower portion disposed inwardly of the wheel well and centrally of the decency panel to afford passenger foot space on both sides thereof and an upper portion offset outwardly above the wheel well and beside the side wall at passenger head level.

6. A passenger coach having wheel wells indented in the side walls, a loading platform ahead of the well on one side, an upright decency panel between the loading platform and the passenger space, an operator station ahead of the well on the other side and being characterized by a vertical riser duct adjacent each side wall, the riser duct at the operator station side fitting close to the side wall throughout its length with its lower end positioned ahead of the adjacent wheel well, the opposite side riser having its upper portion fitted close to the wall at passenger eye level with an inwardly offset lower portion extending beside and clearing the adjacent wheel well and being located behind the decency panel in longitudinal alignment with the center line of the row of passenger seats and affording passenger foot room on opposite sides thereof.

DWIGHT E. AUSTIN.